US009035950B2

(12) United States Patent
 Kawakita et al.

(10) Patent No.: US 9,035,950 B2
(45) Date of Patent: May 19, 2015

(54) COMPUTER-READABLE RECORDING MEDIUM STORING INFORMATION DISPLAY PROGRAM, INFORMATION DISPLAY METHOD, AND INFORMATION PROCESSING APPARATUS

(71) Applicant: Fujitsu Limited, Kawasaki (JP)

(72) Inventors: Yuko Kawakita, Nagoya (JP); Kunio Watanabe, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 316 days.

(21) Appl. No.: 13/660,559

(22) Filed: Oct. 25, 2012

(65) Prior Publication Data
 US 2013/0147808 A1 Jun. 13, 2013

(30) Foreign Application Priority Data
 Dec. 8, 2011 (JP) ................................. 2011-269363

(51) Int. Cl.
 *G06T 11/20* (2006.01)
 *G06T 11/60* (2006.01)

(52) U.S. Cl.
 CPC ...................................... *G06T 11/60* (2013.01)

(58) Field of Classification Search
 None
 See application file for complete search history.

(56) References Cited

U.S. PATENT DOCUMENTS

| 6,154,213 | A  | * | 11/2000 | Rennison et al. | ............. 715/854 |
| 7,812,838 | B1 | * | 10/2010 | Ian | ............................... 345/440 |
| 8,135,660 | B2 | * | 3/2012 | Au | ................................... 706/55 |
| 2007/0237375 | A1 | | 10/2007 | Yamagishi et al. | |

FOREIGN PATENT DOCUMENTS

| JP | 2004-21913 | 1/2004 |
| JP | 2007-252609 | 10/2007 |

OTHER PUBLICATIONS

Isamu Watanabe et al., "Text Mining Based on Keyboard Association", Material of the 55$^{th}$ Special Interest Group on Fundamental Informatics, Information Processing Society of Japan, Jul. 16, 1999, pp. 57-64.

* cited by examiner

*Primary Examiner* — Ryan R Yang
(74) *Attorney, Agent, or Firm* — Staas & Halsey LLP

(57) ABSTRACT

A computer-readable recording medium storing an information display program for causing a computer to execute a process, the process includes: identifying a first component related to a first character string extracted, referring to a first storage unit that stores a plurality of components constituting the article and character strings that individually represent the plurality of components; obtaining first location information related to the first component from a second storage unit that stores pieces of location information corresponding to the plurality of components in the article; determining an eye direction when a shape of the article is displayed; determining second location information of the first component in the shape of the article related to the eye direction, based on the first location information and the eye direction; and displaying the first character string based on the second location information.

15 Claims, 21 Drawing Sheets

FIG. 4

| NUMBER | VEHICLE NAME | COMPLAINT INFORMATION |
|---|---|---|
| 000001 | AAA | FEEL HEAVY TO HANDLE WHEN BACKING CAR INTO GARAGE WHILE STEERING RIGHT |
| 000002 | BBB | FEEL HEAVIER TO USE BRAKE THAN THAT OF OTHER CARS |
| ... | ... | ... |

FIG. 5

| <KEYWORD> ||
|---|---|
| <WORD> | <STRENGTH OF RELATIONSHIP> |
| <WORD> | <STRENGTH OF RELATIONSHIP> |
| ⋮ | ⋮ |

FIG. 6

| COMPONENT NUMBER | COMPONENT NAME | KEYWORD 1 | KEYWORD 2 | KEYWORD 3 | ... |
|---|---|---|---|---|---|
| ST100 | STEERING | STEERING | HANDLE | WHEEL | ... |
| BK005 | BRAKE | BRAKE | BRAKING DEVICE | BRAKE PEDAL | ... |
| ... | ... | ... | ... | ... | ... |

FIG. 7

| <KEYWORD> ||
|---|---|
| <COMPONENT NAME> ||
| <WORD> | <STRENGTH OF RELATIONSHIP> |
| <WORD> | <STRENGTH OF RELATIONSHIP> |
| ⋮ | ⋮ |

FIG. 8

| COMPONENT NUMBER | COMPONENT NAME | LOCATION INFORMATION | SIZE INFORMATION | ... |
|---|---|---|---|---|
| ST100 | STEERING | X1,Y1,Z1 | ... | |
| ST100-W01A | STEERING WHEEL A | X2,Y2,Z2 | ... | |
| ... | ... | ... | ... | ... |

| <KEYWORD> ||
|---|---|
| <LOCATION INFORMATION> ||
| <WORD> | <STRENGTH OF RELATIONSHIP> |
| <WORD> | <STRENGTH OF RELATIONSHIP> |
| ⋮ | ⋮ |

FIG. 10

| <KEYWORD> ||
|---|---|
| <LOCATION INFORMATION> ||
| <RECOMMENDATION DISPLAY SPACING> ||
| <WORD> | <STRENGTH OF RELATIONSHIP> |
| <WORD> | <STRENGTH OF RELATIONSHIP> |
| ⋮ | ⋮ |

FIG. 16

| | 24 |
|---|---|
| VIEW POINT 1 | X1,Y1,Z1 |
| VIEW POINT 2 | X2,Y2,Z2 |
| VIEW POINT 3 | X3,Y3,Z3 |
| ⋮ | ⋮ |

FIG. 18

| <KEYWORD> ||
|---|---|
| <LOCATION INFORMATION> ||
| <RECOMMENDATION DISPLAY SPACING> ||
| r1,r2,r3,r4···rm ||
| <WORD> | <STRENGTH OF RELATIONSHIP> |
| <WORD> | <STRENGTH OF RELATIONSHIP> |
| ⋮ | ⋮ |

FIG. 20

| <KEYWORD> ||
|---|---|
| <LOCATION INFORMATION> ||
| <RECOMMENDATION DISPLAY SPACING> ||
| r1,r2,r3,r4···rm ||
| <DEGREE OF MATCHING f1> ||
| <NUMBER OF DEGREE OF MATCHING f1 N> ||
| <DEGREE OF MATCHING f2> ||
| <WORD> | <STRENGTH OF RELATIONSHIP> |
| <WORD> | <STRENGTH OF RELATIONSHIP> |
| ⋮ | ⋮ |

COMPUTER-READABLE RECORDING MEDIUM STORING INFORMATION DISPLAY PROGRAM, INFORMATION DISPLAY METHOD, AND INFORMATION PROCESSING APPARATUS

CROSS-REFERENCE TO RELATED APPLICATION

This application is based upon and claims the benefit of priority of the prior Japanese Patent Application No. 2011-269363, filed on Dec. 8, 2011, the entire contents of which are incorporated herein by reference.

FIELD

The embodiments discussed herein are related to a computer-readable recording medium storing an information display program, an information display method, and an information processing apparatus.

BACKGROUND

A skeleton map is a diagram visually representing an analysis result by text mining. The skeleton map is a diagram representing the relationship between words and the strength of the relationship in document information that is an analysis target. For example, a technology related to a skeleton map is discussed in Japanese Laid-open Patent Publication No. 2004-21913. In addition, a technology related to display of document information that is an analysis target is discussed in Japanese Laid-open Patent Publication No. 2007-252609.

SUMMARY

According to an aspect of the invention, a computer-readable recording medium storing an information display program for causing a computer to execute a process, the process includes: identifying a first component related to a first character string extracted from document information related to an article, referring to a first storage unit that stores a plurality of components constituting the article and character strings that individually represent the plurality of components; obtaining first location information related to the first component from a second storage unit that stores pieces of location information corresponding to the plurality of components in the article; determining an eye direction when a shape of the article is displayed; determining second location information of the first component in the shape of the article related to the eye direction, based on the first location information and the eye direction; and displaying the first character string based on the second location information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of analysis target information;

FIG. 5 is a diagram illustrating a configuration example of skeleton map information;

FIG. 6 is a diagram illustrating a configuration example of a component keyword correspondence information storage unit;

FIG. 7 is a diagram illustrating a configuration example of keyword information after a determination process for determining a correspondence component has been performed;

FIG. 8 is a diagram illustrating a configuration example of a component location information table stored in a product information storage unit;

FIG. 9 is a diagram illustrating a configuration example of the keyword information after location information has been assigned;

FIG. 10 is a diagram illustrating a configuration example of the keyword information after a display spacing has been assigned;

FIG. 16 is a diagram illustrating a configuration example of a viewpoint information storage unit;

FIG. 18 is a diagram illustrating a configuration example of keyword information after a distance between the keyword and another keyword has been calculated;

FIG. 20 is a diagram illustrating a configuration example of keyword information after a degree of matching has been assigned.

DESCRIPTION OF EMBODIMENTS

There are a wide variety of pieces of document information that is determined as an analysis target to generate a skeleton map. For example, when a skeleton map is created using a complaint, etc. concerning a certain product given from a user as an analysis target, it is probable that the product manufacturer may obtain a hint related to future product development.

However, in a known skeleton map, the display location of each word is defined so that overlapping of words is avoided or the strength of the relationship between words is allowed to be visually recognized. That is, there is no particular relationship between the meaning of a word and its display position. Thus, the user searches for a particular word by visually following words on the skeleton map in order and consequently it takes time to grasp the analysis result represented by the skeleton map.

Therefore, the object of one aspect of the technology of the embodiments discussed herein is to improve the predictability of the display location of a word in a skeleton map.

Figure 1:
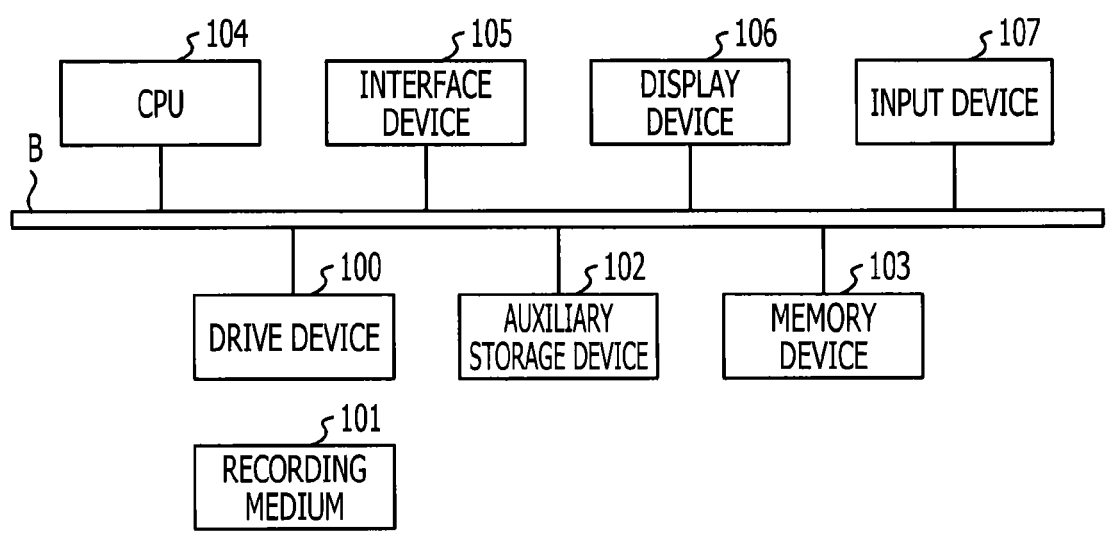
FIG. 1 is a diagram illustrating a hardware configuration example of an information processing apparatus according to an embodiment.

The embodiments are described below with reference to the drawings. FIG. 1 is a diagram illustrating a hardware configuration example of an information processing apparatus according to an embodiment. An information processing apparatus 10 illustrated in FIG. 1 includes a drive device 100, an auxiliary storage device 102, a memory device 103, a central processing unit (CPU) 104, an interface device 105, a display device 106, and an input device 107 that are coupled to one another through a bus B.

A program by which processes in the information processing apparatus 10 are achieved is provided by a recording medium 101. When the recording medium 101 in which the program is recorded is mounted on the drive device 100, the program is installed in the auxiliary storage device 102 through the drive device 100 from the recording medium 101. The installation of the program may be performed without using the recording medium 101, and the program may be downloaded from another computer through a network. The auxiliary storage device 102 stores a desired file, data, etc. in addition to an installed program.

The memory device 103 reads out a program from the auxiliary storage device 102 and stores the program when an activation instruction of the program is issued. The CPU 104 achieves a function of the information processing apparatus 10 in accordance with the program stored in the memory device 103. The interface device 105 is used as an interface that performs connection to the network. The display device 106 displays a graphical user interface (GUI), etc. by utilizing the program. The input device 107 includes a keyboard and a mouse, and is used to perform inputs of various operation instructions.

The recording medium 101 may be a portable recording medium such as a compact disc-read-only memory (CD-ROM), a digital versatile disc (DVD), or a universal serial bus (USB) memory. In addition, the auxiliary storage device 102 may be a hard disk drive (HDD), a flash memory, etc. Each of the recording medium 101 and the auxiliary storage device 102 corresponds to a computer-readable recording medium.

The information processing apparatus 10 may be, in some cases, an processing apparatus not including the display device 106 and the input device 107. For example, the information processing apparatus 10 may be operated remotely by an input device included in a computer coupled to the information processing apparatus 10 through the network. In addition, the processing result, for example, of the information processing apparatus 10 may be displayed on a display device included in the computer coupled to the information processing apparatus 10 through the network.

Figure 2:
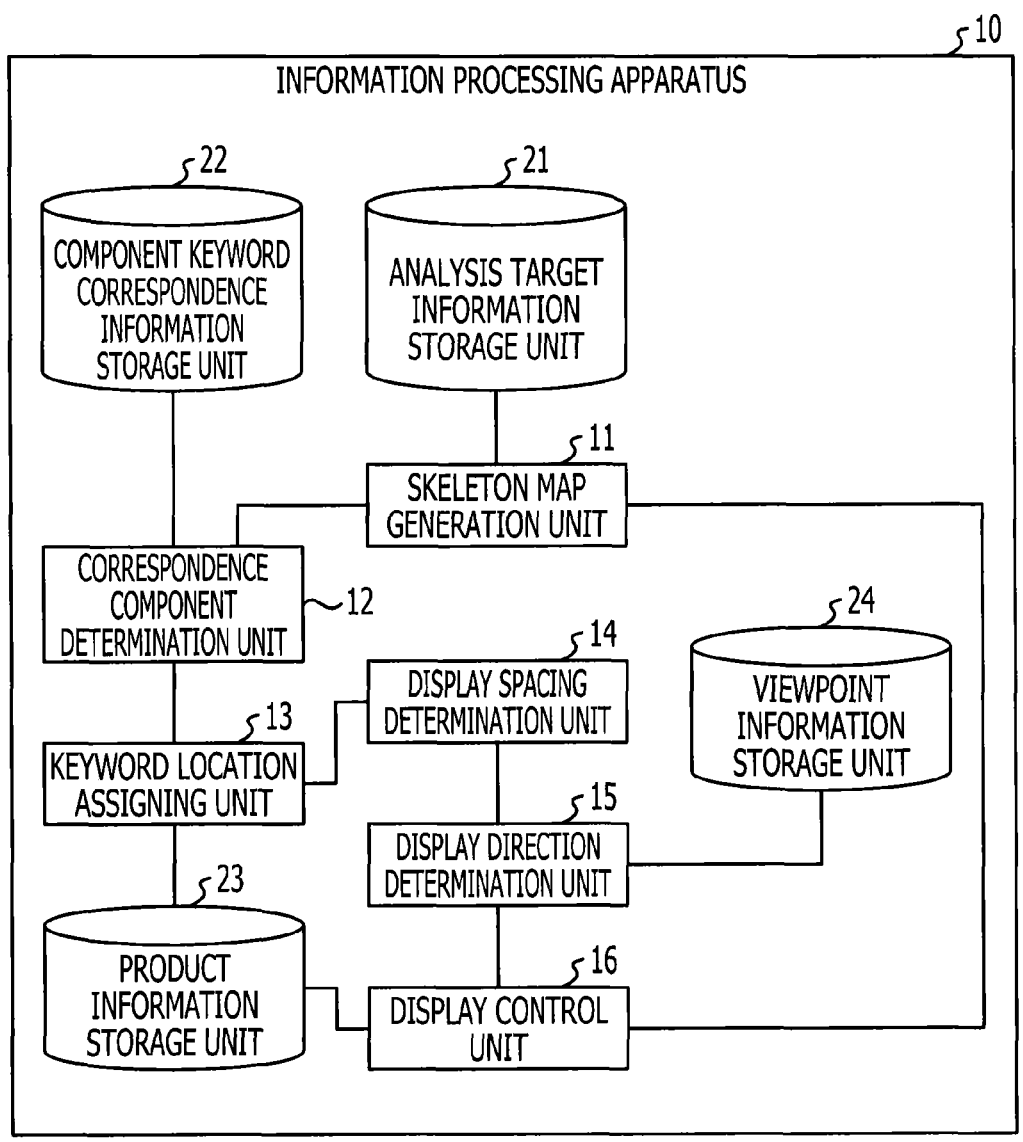
FIG. 2 is a diagram illustrating a function configuration example of the information processing apparatus according to the embodiment.

FIG. 2 is a diagram illustrating a function configuration example of the information processing apparatus 10 according to the embodiment. In FIG. 2, the information processing apparatus 10 includes a skeleton map generation unit 11, a correspondence component determination unit 12, a keyword location assigning unit 13, a display spacing determination unit 14, a display direction determination unit 15, and a display control unit 16. Each of the units is realized by processes that the program installed in the information processing apparatus 10 causes the CPU 104 to execute.

The above-described units utilize an analysis target information storage unit 21, a component keyword correspondence information storage unit 22, a product information storage unit 23, and a viewpoint information storage unit 24. Each of the storage units may be realized by using a storage device, etc. coupled to the auxiliary storage device 102 or the information processing apparatus 10 through the network.

The analysis target information storage unit 21 stores document information to be determined as an analysis target by the skeleton map generation unit 11. Hereinafter, the document information is referred to as "analysis target information". In the embodiment, information related to an article is determined as analysis target information. The information related to the article may be information obtained by converting a complaint, etc. concerning one product given from the user into a text. Hereinafter, the term "product" indicates a product related to analysis target information. In addition, hereinafter, the term "component" refers to a component, a unit, etc. constituting a part of the product.

The skeleton map generation unit 11 analyzes analysis target information using a text mining technology, etc. and extracts information constituting a skeleton map from the document information. The information constituting a skeleton map is information indicating words, the relationship between the words, the strength of the relationship, etc. and information desired to display a skeleton map. Hereinafter, the information constituting a skeleton map is referred to as "skeleton map information".

In the embodiment, a group of keywords is set beforehand, and in the document information, for each of the keywords, a word related to the keyword is extracted. Consequently, the relationship between the keyword and the word related to the keyword, the strength of the relationship, etc. are extracted. In the embodiment, the term "keyword" refers to a word set as a term indicating a product or a component constituting the product by, for example, the user beforehand. In the embodiment, a plurality of keywords are set, and alternatively, one keyword may be set. The term "word" refers to a word that is extracted by being determined to be related to a keyword from analysis target information. Alternatively, a keyword is not set beforehand, and the relationship between words may be extracted from the analysis target information.

In addition, an analysis process for document information that is used to generate a skeleton map may be implemented using a known technology. The known technology that may be applied in the embodiment is not limited to a specific technology. In addition, when it is probable that a display mode of the skeleton map will be complicated in a case in which all words related to a keyword are determined as extraction targets, the words determined as extraction targets may be limited based on certain criteria. The certain criteria include the strength of the relationship of the words and the keyword being a specific value or less.

The component keyword correspondence information storage unit 22 stores correspondence information between each component and a keyword. The correspondence component determination unit 12 determines a correspondence component for each keyword included in skeleton map information generated by the skeleton map generation unit 11. In the determination, the correspondence information stored in the component keyword correspondence information storage unit 22 is utilized.

The product information storage unit 23 stores product information. In the embodiment, the production information includes shape information of the product, location information of each component in the product, etc. The production information may be computer-aided design (CAD) information. Three-dimensional CAD information is desirable for a product having a shape which is represented three-dimensionally. Alternatively, the production information may be information other than CAD information as long as the product information includes information through which the shape of the product, the location of each component in the product, etc. may be grasped.

The keyword location assigning unit 13 assigns location information of a correspondence component to each keyword, based on the determination result by the correspondence component determination unit 12 and the production information. To "assign" is, for example, to store location information associated with a keyword in the memory device 103 or the auxiliary storage device 102.

The display spacing determination unit 14 determines a recommendation value of a display spacing between keywords in the display of a skeleton map in consideration of the visibility of the skeleton map. In detail, the display spacing determination unit 14 determines a recommendation value of a display spacing for a keyword having many relationships with words so that the keyword is away from another keyword as much as possible. In addition, the display spacing determination unit 14 allows a keyword having a few relationships with words to come close to another keyword, and determines a recommendation value of the display spacing. That is, a recommendation value of a display spacing is determined for each keyword.

The display direction determination unit 15 determines a display direction of the product with reference to the display spacing between keywords determined by the display spacing determination unit 14. The display direction of the product may be a direction or an angle from which the product is viewed, or the orientation of the product. A display spacing between components when the product is displayed on a two-dimensional surface varies depending on the display direction of the product. Therefore, a display spacing between keywords corresponding to the components depends on the display direction of the product. The display direction determination unit 15 determines the display direction of the product so that each of the keywords is displayed in a state in which the difference between a recommendation value that is determined by the display spacing determination unit 14 and the display spacing between the keywords is as small as possible.

There are an infinite number of display directions in theory. Thus, in the embodiment, a display direction is determined based on a list of viewpoint information stored in the viewpoint information storage unit 24. The "viewpoint information" is a coordinate value indicating a viewpoint for the product in a coordinate system for shape information of the product.

The display control unit 16 controls, based on the skeleton map information, a skeleton map to be displayed on the display device 106. The display control unit 16 controls a shape diagram of the product to be displayed and controls the skeleton map to be displayed so as to overlap the shape diagram. The shape diagram of the product is a diagram indicating the shape of the product in the display direction determined by the display direction determination unit 15. Each keyword included in the skeleton map is displayed at the location of a component corresponding to the keyword on the shape diagram of the product.

Figure 3:
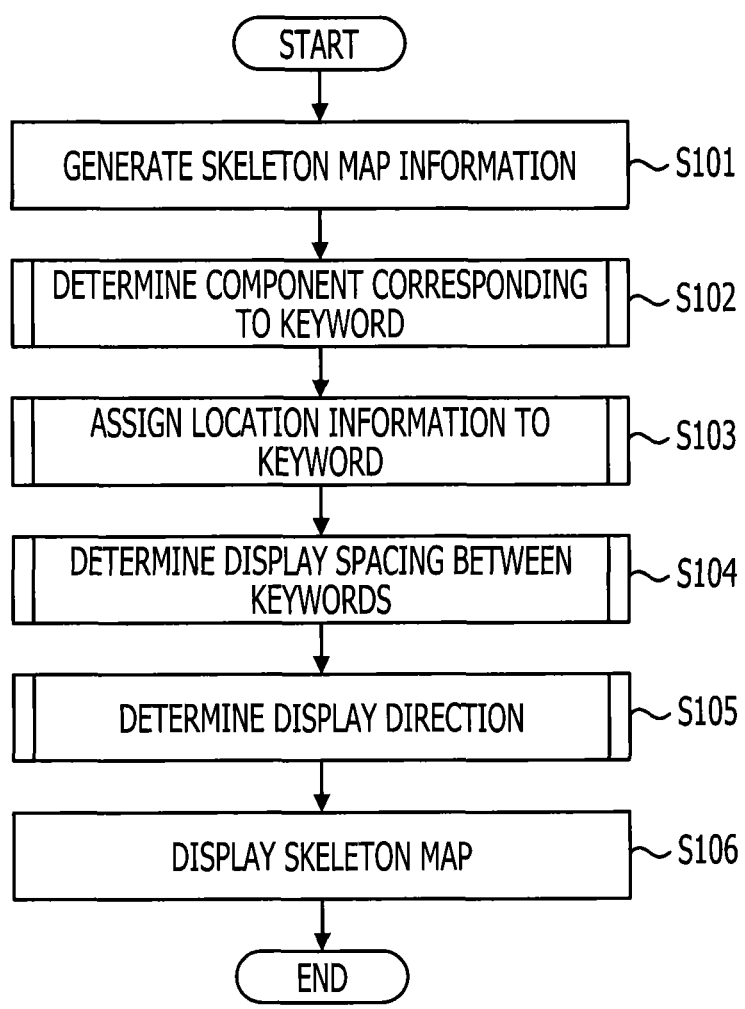
FIG. 3 is a flowchart indicating an example of the outline of a processing procedure executed by the information processing apparatus.

A processing procedure executed by the information processing apparatus 10 is described below. FIG. 3 is a flowchart indicating an example of the outline of the processing procedure executed by the information processing apparatus 10.

In Step S101, the skeleton map generation unit 11 analyzes analysis target information and generates skeleton map information. The generated skeleton map information is stored, for example, in the memory device 103 or the auxiliary storage device 102.

FIG. 4 is a diagram illustrating an example of the analysis target information. In FIG. 4, each record of the analysis target information includes a number, a vehicle name, and complaint information.

The "number" is identification information of the record. The "vehicle name" is the name of a vehicle determined as a target of the complaint. That is, in the embodiment, a vehicle is an example of a product. The "complaint information" is document information obtained by converting the contents of the complaint into text.

The format of the analysis target information is not limited to the format illustrated in FIG. 4. For example, the format may include enumeration of sentences.

FIG. 5 is a diagram illustrating a configuration example of skeleton map information. FIG. 5 illustrates skeleton map information related to one keyword. Thus, for each keyword, information as illustrated in FIG. 5 is generated. Hereinafter, the skeleton map information related to one keyword is referred to as "keyword information". Hereinafter, the skeleton map information is the collection of keyword information of each keyword.

The keyword information includes a keyword and words having relationships with the keyword. The strength of the relationship between each of the words and the keyword is associated with the word. The strength of the relationship may be the degree of association described in Watanabe Isamu et al. "Text Mining Based on Keyword Association", Material of the 55th Special Interest Group on Fundamental Informatics, Information Processing Society of Japan, Jul. 16, 1999, the number of co-occurrences, etc. Alternatively, another indicator may indicate the strength of the relation.

In FIG. 5, the portion enclosed by "<" and ">" is replaced with a specific keyword, word, value indicating the strength of the relation, etc. in actually generated skeleton map information. For example, in a vehicle, the name of each component of the vehicle such as a steering and brake is a keyword.

After that, the correspondence component determination unit 12 determines components corresponding to the respective keywords with reference to the component keyword correspondence information storage unit 22 (S102).

FIG. 6 is a diagram illustrating a configuration example of the component keyword correspondence information storage unit 22. In FIG. 6, the component keyword correspondence information storage unit 22 stores "component number", "component name", and one or more "keywords", etc. for each of the components.

The "component number" and the "component name" are identification information of the component. Information that is used as identification information of each of the components in production information stored in the product information storage unit 23 may be stored in the component keyword correspondence information storage unit 22 instead of the "component number" and the "component name". The one or more "keywords" are keywords indicating components determined by the component number and the component name. In the embodiment, in light of the possibility that one component is represented by a plurality of terms, one or more keywords are associated with one component.

The correspondence component determination unit 12 assigns the name of a component corresponding to a keyword related to each piece of keyword information, to each of the pieces of keyword information. To each of the pieces of keyword information, a component number may be assigned instead of a component name.

FIG. 7 is a diagram illustrating a configuration example of keyword information after a determination process for determining a correspondence component has been performed. As illustrated in FIG. 7, a component name is newly added to one piece of keyword information of the skeleton map information illustrated in FIG. 5.

After that, the keyword location assigning unit 13 assigns location information to each of the pieces of keyword information illustrated in FIG. 7 with reference to the product information storage unit 23 (S103).

FIG. 8 is a diagram illustrating a configuration example of a component location information table stored in the product information storage unit 23. In FIG. 8, a component location information table 23T stores "component number", "component name", "location information", "size information", etc. for each of the components.

The "component number" and the "component name" are as described above. The "location information" is a coordinate value of the location of each of the components in the coordinate system of the shape information of the product. In the embodiment, three-dimensional shape information of the product is described as an example. Thus, the "location information" of each of the components is a three-dimensional coordinate value. The "size information" is information indicating the dimension of each part of individual components, etc.

The keyword location assigning unit 13 assigns location information to each piece of keyword information by replacing, for example, the component name of each of the pieces of keyword information with location information that is associated with the component name and stored in the component location information table 23T. As a result, the configuration of the keyword information varies as illustrated in FIG. 9.

FIG. 9 is a diagram illustrating a configuration example of the keyword information after location information has been assigned. In the keyword information illustrated in FIG. 9, the component name of the keyword information illustrated in FIG. 7 is replaced with location information.

After that, the display spacing determination unit 14 determines, for each of the keywords, a recommendation value of a display spacing between the keyword and another keyword (S104). The display spacing determination unit 14 assigns the recommendation value determined for the keyword, to the keyword information of the each of the keywords.

FIG. 10 is a diagram illustrating a configuration example of the keyword information after a display spacing has been assigned. A recommendation display spacing is added to the keyword information illustrated in FIG. 10. The recommendation display spacing is a recommendation value of a display spacing between a keyword and another keyword.

After that, the display direction determination unit 15 determines a display direction of the product, based on the recommendation display spacing of each of the keywords (S105).

After that, the display control unit 16 controls a shape diagram of the product to be displayed on the display device 106, based on shape information of the product stored in the product information storage unit 23. In addition, the display control unit 16 controls a skeleton map based on the skeleton map information including a plurality of pieces of keyword information to be displayed on the display device 106 so as to overlap the shape diagram (S106).

Figure 11:
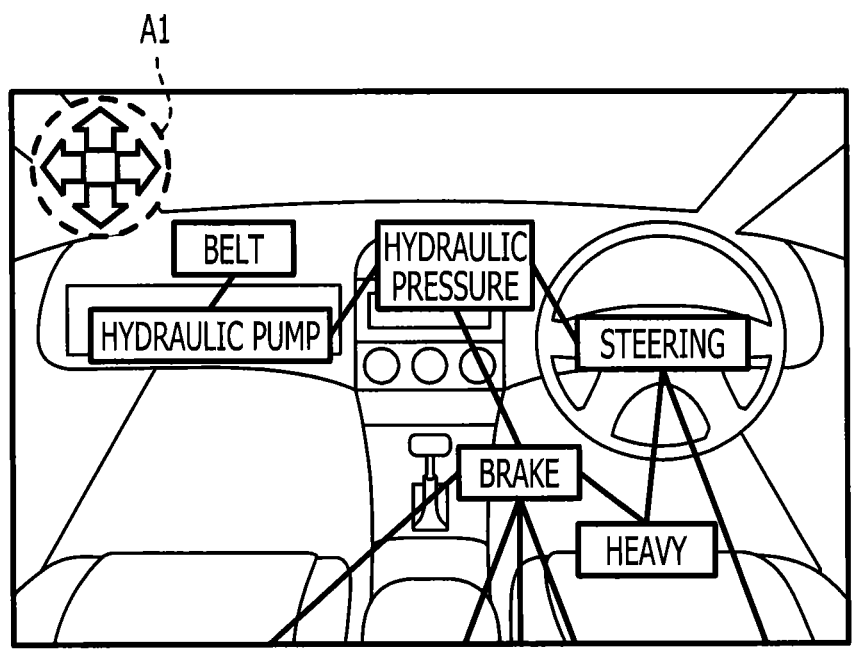
FIG. 11 is a diagram illustrating a display example of a skeleton map.

FIG. 11 is a diagram illustrating a display example of a skeleton map. In FIG. 11, a shape diagram of the product indicates the shape of the product in the display direction determined by the display direction determination unit 15. In addition, each keyword included in the skeleton map is arranged in a location obtained by associating location information included in the keyword information related to the keyword with a coordinate system of the shape diagram.

The location obtained by associating location information with a coordinate system of the shape diagram is a location obtained by converting the location information into a coordinate value of the coordinate system. As a result, each of the keywords of the skeleton map is displayed on a component corresponding to the keyword or in the vicinity of the component. Thus, the user is allowed to easily predict the location of a component of which one keyword is arranged in the vicinity.

For example, when the user who wants to grasp a problem, complaint, etc. concerning steering performs information collection of complaints, etc. concerning "steering", the search range may be limited to the periphery of the steering in a shape diagram. As a result, the user is allowed to quickly find a keyword that the user focuses at the periphery of a location corresponding to the keyword in the shape diagram without visually following keywords constituting a skeleton map one by one. Thus, the user may grasp a word related to the keyword.

In FIG. 11, a graphic symbol A1 including arrows in four directions is used to change the display direction. That is, in response to clicking, for example using a mouse, corresponding to one of the arrows in the graphic symbol A1, the display direction may move in the arrow direction. In such a case, the display direction of a movement destination may be a direction not restricted by viewpoint information stored in the viewpoint information storage unit 24. That is, the movement of the display direction may be performed in a direction selected based on a unit smaller than the viewpoint information.

Display of a shape diagram of the product may be omitted. That is, the skeleton map may be displayed without overlapping the shape diagram. Even when the shape diagram of the product is not displayed, the user may easily predict the location of each of the keywords in the skeleton map in light of the positional relationship of components in the product as long as the display direction of the product is known.

In addition, the location of each word having a relationship with a keyword may be determined by any method. For example, the location of a word that does not overlap another word or keyword may be selected and determined by another method used in a known skeleton map generation method.

Figure 12:
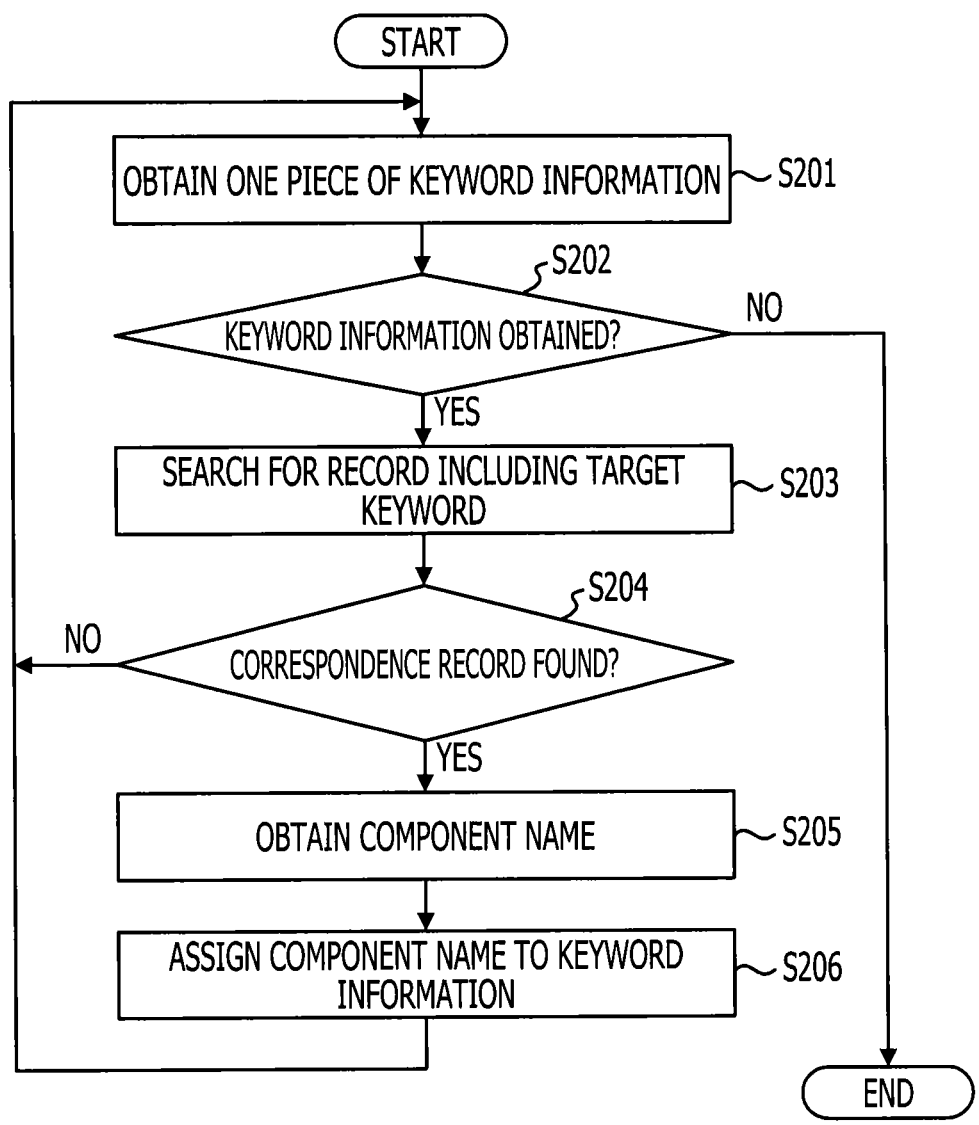
FIG. 12 is a flowchart indicating an example of a processing procedure of a determination process for determining a component corresponding to a keyword.

Next, a process in Step S102 is described in detail. FIG. 12 is a flowchart indicating an example of a processing procedure of a determination process for determining a component corresponding to a keyword.

In Step S201, the correspondence component determination unit 12 determines one piece of unprocessed keyword information as a processing target among pieces of skeleton map information generated by the skeleton map generation unit 11. The "unprocessed keyword information" is keyword information that has not been determined as a processing target in Step S203 and subsequent steps. Hereinafter, keyword information determined as a processing target is referred to as "target keyword information". The keyword information in such a stage includes, for example, the configuration illustrated in FIG. 5.

When target keyword information is obtained, that is, when unprocessed keyword information remains (Yes in S202), the correspondence component determination unit 12 searches the component keyword correspondence information storage unit 22 of FIG. 6 for a record including a keyword corresponding to the target keyword (S203). When the correspondence record is not found (No in S204), Step S201 and subsequent steps are repeated for the other pieces of unprocessed keyword information.

When the correspondence record is found (Yes in S204), the correspondence component determination unit 12 obtains a component name from the record (S205). After that, the correspondence component determination unit 12 assigns the component name to the target keyword information (S206). As a result, the configuration of the target keyword information varies, for example, as illustrated in FIG. 7.

When the process is completed for all pieces of keyword information included in the skeleton map information (No in S202), the process of FIG. 12 ends.

Figure 13:
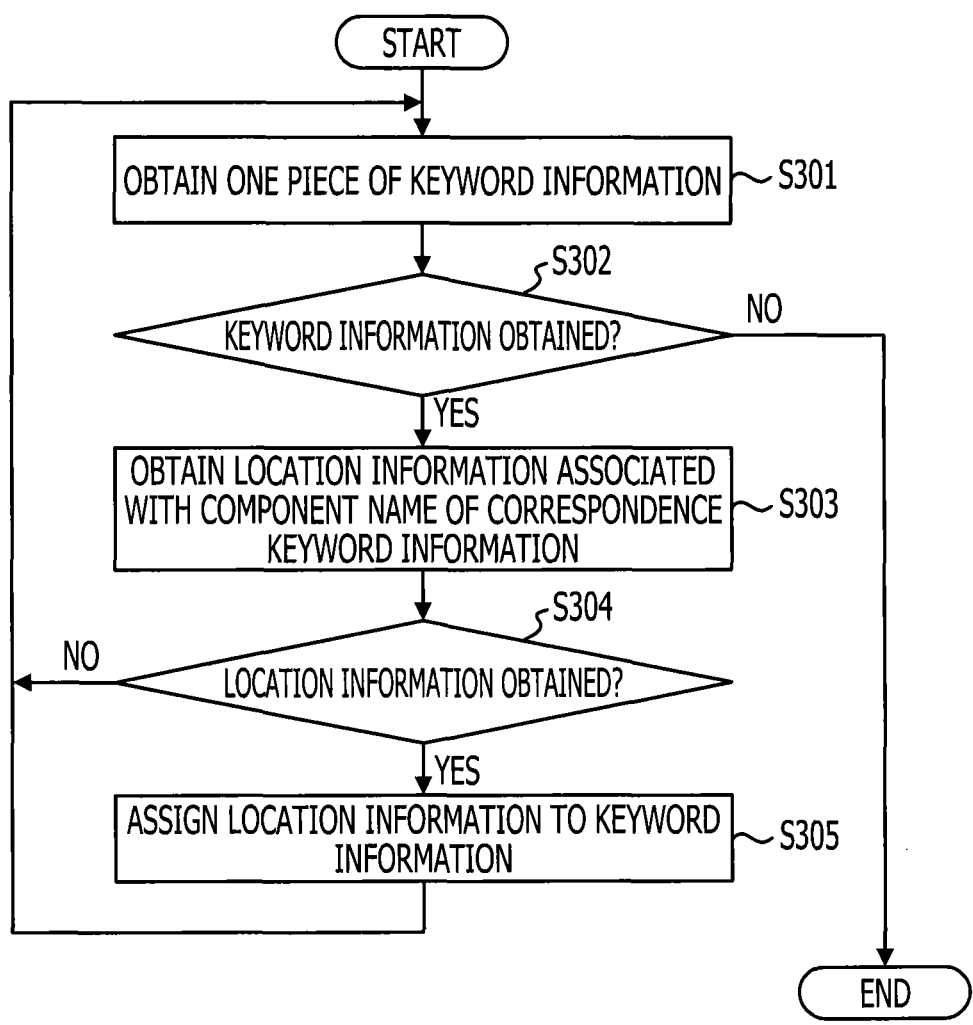
FIG. 13 is a flowchart indicating an example of a processing procedure of an assigning process for assigning location information for a keyword.

Next, the process in Step S103 of FIG. 3 is described in detail. FIG. 13 is a flowchart indicating an example of a processing procedure of an assigning process for assigning location information to the keyword.

In Step S301, the keyword location assigning unit 13 determines one piece of unprocessed keyword information as a processing target among pieces of keyword information to which the component names have been assigned by the correspondence component determination unit 12. The "unprocessed keyword information" is keyword information that has not been determined as a processing target in Step S303 and subsequent steps. Hereinafter, keyword information determined as a processing target is referred to as "target keyword information". The keyword information in such a stage includes, for example, the configuration illustrated in FIG. 7.

When target keyword information is obtained, that is, when unprocessed keyword information remains (Yes in S302), the keyword location assigning unit 13 obtains location information associated with a component name included in the target keyword information from the component location information table 23T illustrated in FIG. 8 (S303). When location information is not obtained (No in S304), Step S301 and subsequent steps are repeated for the other pieces of unprocessed keyword information.

When location information is obtained (Yes in S304), the keyword location assigning unit 13 assigns the location information to the target keyword information (S305). For example, the component name of the target keyword information is replaced with the location information. As a result, the configuration of the target keyword information varies, for example, as illustrated in FIG. 9.

When the process is completed for all pieces of keyword information determined as processing targets (No in S302), the process of FIG. 13 ends.

Figure 14:
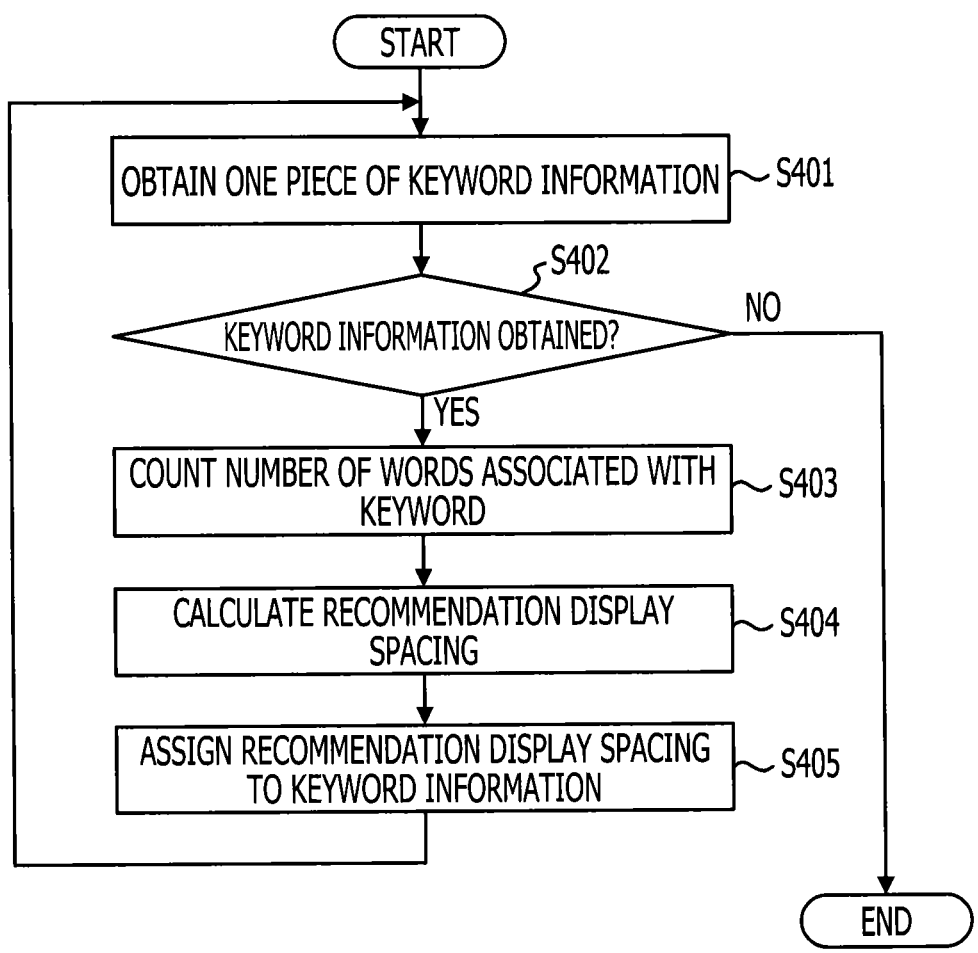
FIG. 14 is a flowchart indicating an example of a processing procedure of a determination process for determining a recommendation display spacing between keywords.

Next, the process in Step S104 of FIG. 3 is described in detail. FIG. 14 is a flowchart indicating an example of a processing procedure of a determination process for determining a recommendation display spacing between keywords.

In Step S401, the display spacing determination unit 14 determines one piece of unprocessed keyword information as a processing target among pieces of keyword information to which pieces of location information are assigned by the keyword location assigning unit 13. The "unprocessed keyword information" is keyword information that has not been determined as a processing target in Step S403 and subsequent steps. Hereinafter, keyword information determined as a processing target is referred to as "target keyword information". The keyword information in such a stage includes, for example, the configuration illustrated in FIG. 9.

When target keyword information is obtained, that is, when unprocessed keyword information remains (Yes in S402), the display spacing determination unit 14 counts the number of words included in the target keyword information (S403). That is, the number of words having relationships with a keyword related to the target keyword information is counted.

After that, the display spacing determination unit 14 calculates a recommendation display spacing for the keyword related to the target keyword information (S404). The recommendation display spacing is calculated, for example, using the following expression (1).

$$\text{A recommendation display spacing} = \text{number of words} \times \alpha \quad (1)$$

The above-described "number of words" is the number of words counted in Step S403. According to the expression (1), as the number of words increases, the recommendation display spacing increases. In the display of the skeleton map, it is highly probable that a large number of words are arranged in the vicinity of a keyword with which the number of words having a relationship is large. When a display spacing between such a keyword and another keyword is large, the visibility of the keywords and the visibility of words related to the respective keywords may be improved. Thus, in the expression (1), a recommendation display spacing is set so as to be increased in proportion to the number of words.

The "$\alpha$" is, for example, a coefficient set beforehand. The coefficient "$\alpha$" is, for example, a coefficient to be used to adjust a display spacing to an appropriate scale on a shape diagram of the product, based on a size indicated by the shape diagram of the product.

In addition, the coefficient "$\alpha$" may be determined in consideration of the resolution of the display device 106. For example, in a case in which a unit of the size of a character string indicating a keyword or word is a dot, the display size of the keyword and word decreases as the resolution increases. Therefore, even when a display spacing of keywords is reduced, the probability that the keywords overlap each other is reduced. Thus, the coefficient $\alpha$ may be adjusted so that the recommendation display spacing decreases as the resolution increases and the recommendation display spacing increases as the resolution decreases.

In the embodiment, a unit of the recommendation display spacing is calculated as a unit in a coordinate system of shape information of the product. Alternatively, the unit of the recommendation display spacing may be the number of dots.

After that, the display spacing determination unit 14 assigns the calculated recommendation display spacing to the target keyword information (S405). As a result, the configuration of the target keyword information varies, for example, as illustrated in FIG. 10.

When the process is completed for all pieces of keyword information determined as processing targets (No in S402), the process of FIG. 14 ends.

Figure 15:
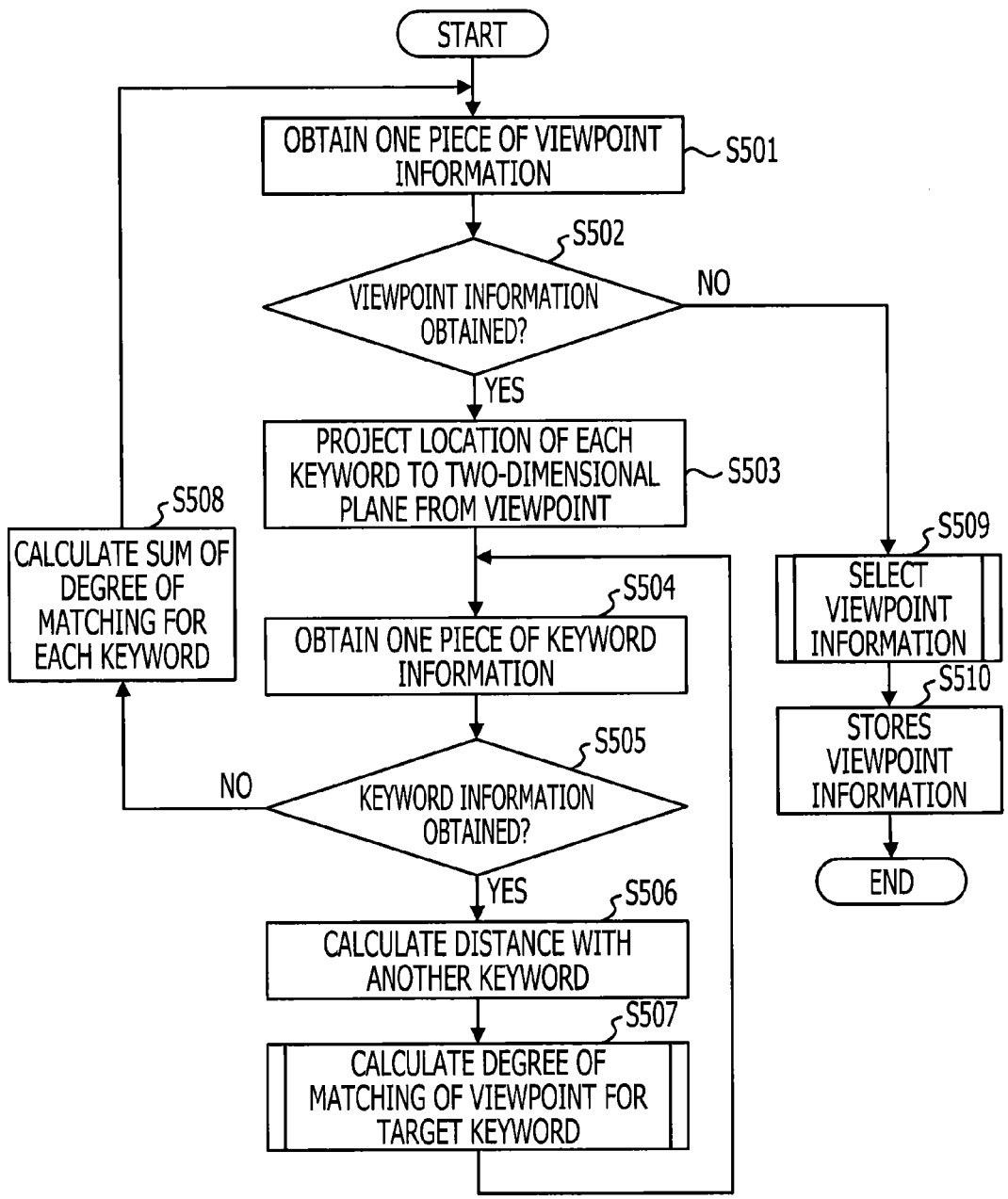
FIG. 15 is a flowchart indicating an example of a processing procedure of a determination process for determining a display direction.

Next, the process in Step S105 of FIG. 3 is described in detail. FIG. 15 is a flowchart indicating an example of a processing procedure of a determination process for determining the display direction.

In Step S501, the display direction determination unit 15 obtains one piece of viewpoint information from the viewpoint information storage unit 24.

FIG. 16 is a diagram illustrating a configuration example of the viewpoint information storage unit 24. In FIG. 16, the viewpoint information storage unit 24 stores, for each viewpoint, a coordinate value of the viewpoint. The coordinate value is a coordinate value of a coordinate system of the shape information of the product. In Step S501, a coordinate value of one viewpoint is obtained as viewpoint information. Hereinafter, the obtained viewpoint information is referred to as "target viewpoint information". The location of a viewpoint may be placed outside the product or inside the product. In addition, the viewpoint information may include a vector indicating an eye direction in addition to the coordinate value of the viewpoint. In this case, the vector indicating the eye direction may be used as a vector that is described later.

When target viewpoint information is obtained, that is, when unprocessed viewpoint information remains (Yes in S502), the display direction determination unit 15 determines a two-dimensional plane orthogonal to a vector having coordinates of the target viewpoint information as a starting point and a specific location as an ending point, as a projection surface of the shape information of the product. The display direction determination unit 15 calculates a coordinate value when a location indicated by location information of each of the pieces of keyword information is projected to the projection surface (S503).

That is, a coordinate value of location information in a three-dimensional coordinate system of the shape information of the product is converted into a coordinate value in a two-dimensional coordinate system of the projection surface. As the ending point of the vector, for example, a certain location such as an original point of the three-dimensional coordinate system of the shape information of the product or the position of a gravity point of the product may be selected in the three-dimensional coordinate system.

After that, the display direction determination unit 15 obtains one piece of keyword information as a processing target (S504). Hereinafter, keyword information determined as a processing target is referred to as "target keyword information". When target keyword information is obtained, that is, when unprocessed keyword information remains for Steps S506 and S507 (Yes in S505), the display direction determination unit 15 calculates a distance between a keyword related to the target keyword information and a keyword related to another keyword information on the projection surface (S506). That is, a coordinate value on the projection surface is used to calculate the distance.

Figure 17:
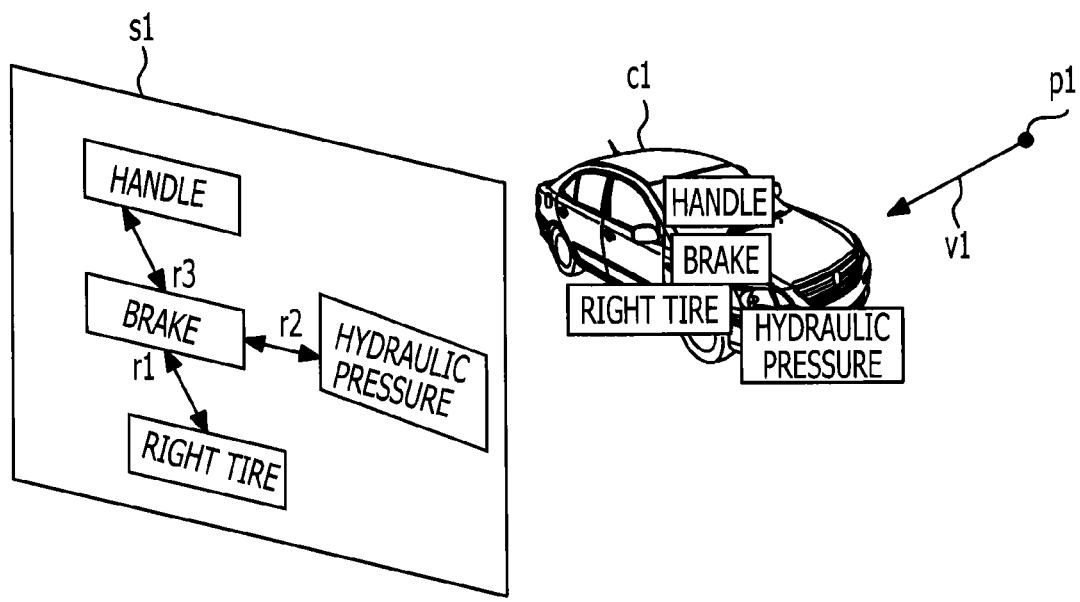
FIG. 17 is a diagram illustrating a distance between keywords on a projection surface.

FIG. 17 is a diagram illustrating a distance between keywords on the projection surface. In FIG. 17, keywords are arranged for a vehicle c1. FIG. 17 schematically illustrates a state in which location information of a component corresponding to each of the keywords is assigned to the keyword.

In addition, in FIG. 17, the location of each of the keywords is illustrated in a case in which, on a projection surface s1 on the right side of the vehicle c1, the vehicle c1 is projected from a direction of a vector v1 that has a viewpoint p1 located on the left side of the vehicle c1, as a viewpoint. The "left side" and "right side" does not correspond to a left and right direction in the diagram, but corresponds to a left and right direction with respect to the vehicle c1.

In FIG. 17, a keyword related to the target keyword information is, for example, a "brake". In this case, a distance r1 between the "brake" and a "right tire", a distance r2 between the "brake" and a "hydraulic pressure", and a distance r3 between the "brake" and a "handle" on the projection surface s1 are calculated. When there is another keyword, a distance between the "brake" and another keyword is calculated.

The display direction determination unit 15 assigns each of the calculated distances to the target keyword information. As a result, the configuration of the target keyword information varies, for example, as illustrated in FIG. 18.

FIG. 18 is a diagram illustrating a configuration example of the target keyword information after a distance between the keyword related to target keyword information and another keyword is calculated. As illustrated in FIG. 18, distances between the keyword related to target keyword information and the other keywords are added to the target keyword information. In FIG. 18, the distances are represented by r1, r2, r3, . . . , and rn. The value of n is determined based on the number of other keywords.

After that, the display direction determination unit 15 calculates a degree of matching of the viewpoint related to the target viewpoint information for a recommendation display spacing of the target keyword information (S507). That is, a degree of matching of a distance between the keyword related to the target keyword information and another keyword on the projection surface, with the recommendation display spacing of the target keyword information, is calculated as a degree of matching by a specific calculation method.

When Steps S506 and S507 are executed for all pieces of keyword information that are determined as processing targets (No in S505), the display direction determination unit 15 calculates the sum of degrees of matching obtained for each of the pieces of keyword information and assigns the calculation result to the target viewpoint information (S508).

After that, next unprocessed viewpoint information is determined as target viewpoint information (S501), and Step S502 and subsequent steps are executed. As a result, a degree of matching is assigned for each of the pieces of viewpoint information.

When the process is completed for all the pieces of viewpoint information (No in S502), the display direction determination unit 15 compares the respective sums of degrees of matching for pieces of viewpoint information, and selects one piece of viewpoint information among the plurality of pieces of viewpoint information (S509). After that, the display direction determination unit 15 stores the selected viewpoint information in, for example, the memory device 103, the auxiliary storage device 102, or the like (S510).

In Step S106 of FIG. 3, the shape information of the product and the skeleton map are displayed in the display direction defined based on the stored viewpoint information. That is, the shape information and the skeleton map of the product are displayed so as to be projected to the projection surface orthogonal to the vector having the viewpoint indicated by the viewpoint information as the starting point and the specific location as the ending point as illustrated in FIG. 11.

Figure 19:
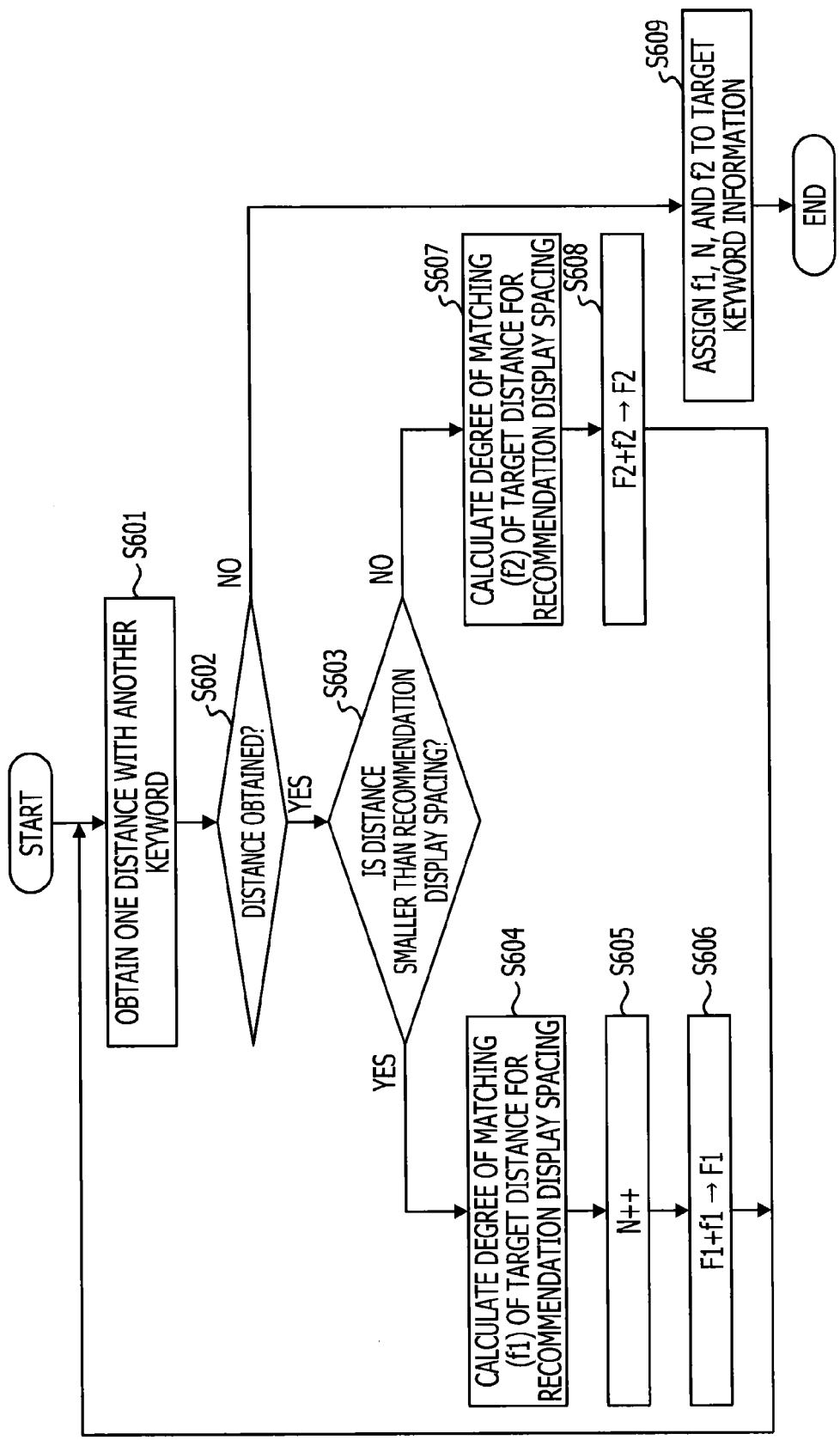
FIG. 19 is a flowchart indicating an example of a processing procedure of a calculation process for calculating a degree of matching of a viewpoint for a recommendation display spacing.

Next, the process in Step S507 of FIG. 15 is described in detail. FIG. 19 is a flowchart indicating an example of a processing procedure of a calculation process for calculating a degree of matching of a viewpoint for a recommendation display spacing.

In Step S601, the display direction determination unit 15 obtains one distance between the keyword and another keyword from the target keyword information. For example, in the example of FIG. 10, first, the "r1" is obtained. Hereinafter, the obtained distance is referred to as a "target distance". When a target distance is obtained, that is, when an unprocessed distance remains (Yes in S602), the display direction determination unit 15 determines whether or not the target distance is smaller than the recommendation display spacing of the target keyword information (S603).

When the target distance is smaller than the recommendation display spacing of the target keyword information (Yes in S603), the display direction determination unit 15 calculates a "degree of matching f1" of the target distance for the recommendation display spacing (S604). For example, the "degree of matching f1" is calculated so as to become a small value as an absolute value of the difference between the recommendation display spacing and the target distance increases. For example, a reciprocal of the absolute value of the difference may be the "degree of matching f1".

After that, the display direction determination unit 15 adds one to a value of a variable N (S605). The variable N is a variable to store the number of distances that are smaller than the recommendation display spacing of the target keyword information, and is initialized to "zero" in the start of the process of FIG. 19. After that, the display direction determination unit 15 adds the "degree of matching f1" to a variable F1 (S606). The variable F1 is a variable to store the sum of "degrees of matching f1" related to the distances smaller than the recommendation display spacing of the target keyword information, and is initialized to "zero" in the start of the process of FIG. 19.

On the other hand, when the target distance is greater than or equal to the recommendation display spacing of the target keyword information (No in S603), the display direction determination unit 15 calculates a "degree of matching f2" of the target distance for the recommendation display spacing (S607). For example, the "degree of matching f2" is calculated so as to become a small value as an absolute value of the difference between the recommendation display spacing and the target distance increases. For example, a reciprocal of the absolute value of the difference may be the "degree of matching f2".

After that, the display direction determination unit 15 adds the "degree of matching f2" to a variable F2 (S608). The variable F2 is a variable to store the sum of "degrees of matching f2" related to the distances greater than or equal to the recommendation display spacing of the target keyword information, and is initialized to "zero" in the start of the process of FIG. 19.

When the process is completed for all distances between the keyword related to the target keyword information and the other keywords (No in S602), the display direction determination unit 15 assigns the "degree of matching f1", the "number of degrees of matching f1 N", and the "degree of matching f2" to the target keyword information (S609). As a result, the configuration of the target keyword information varies, for example, as illustrated in FIG. 20.

FIG. 20 is a diagram illustrating a configuration example of the target keyword information after degrees of matching are assigned. As illustrated in FIG. 20, a "degree of matching f1", the "number of degrees of matching f1 N", and a "degree of matching f2" are added to the target keyword information.

In Step S508 of FIG. 15, the sum is calculated for each of the "degrees of matching f1", the "number of degrees of matching f1 N", and the "degrees of matching f2" and the sums are assigned to the target viewpoint information. Hereinafter, each of the sums is referred to as a "degree of matching f1 sum", a "number N sum", and a "degree of matching f2 sum".

Figure 21:
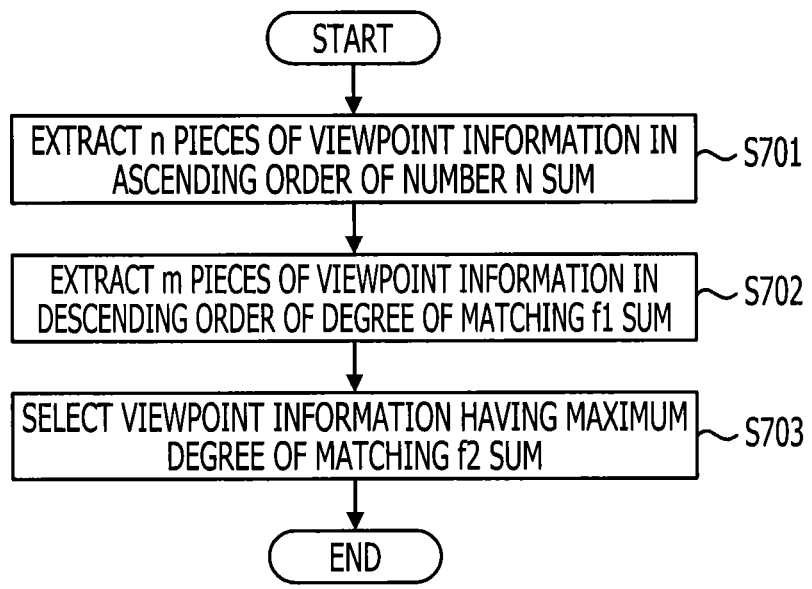
FIG. 21 is a flowchart indicating an example of a processing procedure of a selection process for selecting viewpoint information.

Next, the process in Step S509 of FIG. 15 is described in detail. FIG. 21 is a flowchart indicating an example of a processing procedure of a selection process for selecting viewpoint information.

In Step S701, the display direction determination unit 15 extracts n pieces of viewpoint information in ascending order of the "number N sum" from among pieces of viewpoint information to which the "degree of matching f1 sum", etc. are assigned. As a result, viewpoint information related to a viewpoint in which the probability that words overlap each other is relatively small is extracted. That is, the "number N sum" is the number of distances that are each smaller than a recommendation display spacing. Such a viewpoint in which the probability that words overlap each other is relatively small may be a viewpoint having a small number of distances smaller than the recommendation display spacing among distances between keywords in the viewpoint. Thus, the viewpoint may be a viewpoint in which the probability of a lot of words being in a narrow area is small. As a result, the viewpoint may be a viewpoint in which the probability that words overlap each other is small. A value of n may be a given value. For example, the value of n may be 10.

After that, the display direction determination unit 15 extracts m pieces of viewpoint information in descending order of "degree of matching f1 sum" among n pieces of the extracted viewpoint information (S702). As a result, viewpoint information related to a viewpoint in which the probability that keywords overlap each other is relatively small is extracted. That is, the "degree of matching f1 sum" is the sum of degrees of matching related to distances that are each smaller than the recommendation display spacing. Therefore, a viewpoint having a large "degree of matching f1 sum" may be a viewpoint having a small number of distances between keywords smaller than the recommendation display spacing. Thus, the viewpoint may be a viewpoint in which the probability that keywords overlap each other is relatively small. A value of m may be a given value that satisfies the condition of m<n. For example, the value of m may be five.

After that, the display direction determination unit 15 selects viewpoint information having a maximum "degree of matching f2 sum" from among m pieces of extracted viewpoint information (S703). The viewpoint information selected in Step S703 is stored in Step S510 of FIG. 15 and used for the display of the product and the skeleton map in Step S106 of FIG. 3.

As a result of Step S703, viewpoint information related to a viewpoint in which distances between keywords do not become too large is selected. That is, the "degree of matching f2 sum" is the sum of degrees of matching related to a distance that is greater than or equal to the recommendation display spacing. Thus, a viewpoint having a large "degree of matching f2 sum" may be a viewpoint having a small number of distances between keywords larger than the recommendation display spacing. Thus, the viewpoint is a viewpoint in which a distance between keywords does not become too large.

However, in a state of a large distance between keywords, an effect on the degradation of the visibility of a keyword and a word of the skeleton map is small as compared with a state of a small distance between keywords. Thus, Step S703 may be omitted. In that case, in Step S702, viewpoint information having a maximum "degree of matching f1 sum" is selected.

In addition, multiple pieces of viewpoint information may be finally selected. A certain number of pieces of viewpoint information are selected, and a viewpoint may be changed from a viewpoint to another viewpoint among viewpoints related to the certain number of pieces of viewpoint information, by the operation of the user.

In addition, a method of selecting viewpoint information is not limited to the above-described method. For example, the number of keywords that overlap each other or the number of words that overlap each other is calculated for each viewpoint, and viewpoint information having a minimum value in the number of keywords or the number of words may be selected.

In addition, in some cases, automatic selection of a viewpoint is not performed from the beginning. For example, in a state in which the shape of the product is displayed, a viewpoint may be selected while rotating the product in response to the operation of the user. In this case, location information of each keyword constituting the skeleton map is desired to be converted with respect to a projection surface on which shape information of the product is projected in a display direction based on the viewpoint.

In addition, a viewpoint may be selected by the operation of the user for each piece of viewpoint information stored in the viewpoint information storage unit 24. In this case also, location information of each keyword constituting the skeleton map is desired to be converted with respect to the projection surface on which shape information of the product is projected in a display direction based on the viewpoint.

In addition, one piece of viewpoint information is set beforehand, and a display direction based on the viewpoint information may be employed.

When the display direction is automatically determined in consideration of the visibility of a keyword and a word, the burden of the operation of the user is reduced.

When viewpoint information stored in the viewpoint information storage unit 24 is used, for each piece of viewpoint information, data indicating a shape diagram of the product in a state of being projected on a projection surface may be generated beforehand and stored in the auxiliary storage device 102, etc. In this case, consumption of the capacity of the storage device is increased, however, the process for displaying a shape diagram of the product may be performed at a high speed.

As described above, in the embodiment, a display position of each keyword constituting a skeleton map is determined based on the location of a component corresponding to the keyword in components constituting an article that is a target of document information from which the skeleton map is extracted. Thus, the predictability of the arrangement location of each of the keywords may be increased on the skeleton map. As a result, the user is allowed to quickly find a keyword that the user focuses and quickly grasp the analysis result related to the keyword.

In addition, when the display direction is selected automatically or manually, the skeleton map is allowed to be displayed in a state in which a keyword and a word constituting the skeleton map is read easily. That is, in the embodiment, the display position of each of the keywords is limited by the location of a component corresponding to the keyword. Thus, the flexibility of the display position of each of the keywords becomes small as compared with a general skeleton map, causing the probability that keywords or words overlap each other to increase. In the embodiment, the probability of reducing such an inconvenience caused by associating the location of a keyword with a component is allowed to be increased.

In the embodiment, the correspondence component determination unit 12 is an example of a determination unit. The component keyword correspondence information storage unit 22 is an example of a correspondence information storage unit. The component location information table 23T is an example of a location information storage unit. The keyword location assigning unit 13 is an example an assigning unit. The display control unit 16 is an example of a display position determination unit.

The embodiments are described in detail above. The present disclosure is not limited to the specific embodiments, and various modifications and changes are allowed to be made within the scope of the gist of the present disclosure described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What claimed is:

1. A non-transitory computer-readable recording medium storing an information display program for causing a computer to execute a process, the process comprising:
   identifying a first component related to a first character string extracted from document information related to an article, referring to a first storage unit that stores a plurality of components constituting the article and character strings that individually represent the plurality of components;
   obtaining first location information related to the first component from a second storage unit that stores pieces of location information corresponding to the plurality of components in the article;
   determining an eye direction when a shape of the article is displayed;
   determining second location information of the first component in the shape of the article related to the eye direction, based on the first location information and the eye direction; and
   displaying the first character string based on the second location information.

2. The non-transitory computer-readable recording medium according to claim 1, the process further comprising:
   identifying a second component related to a second character string extracted from the document information, referring to the first storage unit;
   extracting at least one word related to the first character string from the document information; and
   determining a display spacing between the first character string and the second character string in accordance with the number of the at least one word.

3. The non-transitory computer-readable recording medium according to claim 2, wherein the determining of the eye direction determines the eye direction based on the display spacing.

4. The non-transitory computer-readable recording medium according to claim 3, wherein the determining of the eye direction comprises:
   calculating, for each of a plurality of eye directions including the eye direction, first display coordinates of the first character string and second display coordinates of the second character string for a shape of the article related to each of the plurality of eye directions,
   comparing a distance between the first display coordinates and the second display coordinates with the display spacing, and
   determining, based on a result of the comparing, the eye direction among the plurality of eye directions.

5. The non-transitory computer-readable recording medium according to claim 1, the process further comprising:
   extracting at least one word related to the first character string from the document information; and
   displaying the at least one word and the first character string on a diagram of the shape of the article from the eye direction.

6. An information display method executed by a computer, the method comprising:
   identifying a first component related to a first character string extracted from document information related to an article, referring to a first storage unit that stores a plurality of components constituting the article and character strings that individually represent the plurality of components;

obtaining first location information related to the first component from a second storage unit that stores pieces of location information corresponding to the plurality of components in the article;

determining an eye direction when a shape of the article is displayed;

determining second location information of the first component in the shape of the article related to the eye direction, based on the first location information and the eye direction; and displaying the first character string based on the second location information.

7. The information display method according to claim 6, further comprising:

identifying a second component related to a second character string extracted from the document information, referring to the first storage unit;

extracting at least one word related to the first character string from the document information; and determining a display spacing between the first character string and the second character string in accordance with the number of the at least one word.

8. The information display method according to claim 7, wherein the determining of the eye direction determines the eye direction based on the display spacing.

9. The information display method according to claim 8, wherein the determining of the eye direction comprises:

calculating, for each of a plurality of eye directions including the eye direction, first display coordinates of the first character string and second display coordinates of the second character string for a shape of the article related to each of the plurality of eye directions, comparing a distance between the first display coordinates and the second display coordinates with the display spacing, and determining, based on a result of the comparing, the eye direction among the plurality of eye directions.

10. The information display method according to claim 6, further comprising:

extracting at least one word related to the first character string from the document information; and displaying the at least one word and the first character string on a diagram of the shape of the article from the eye direction.

11. An information processing apparatus comprising:

a memory that stores correspondence information that associates each of a plurality of components constituting an article with a character string representing each of the plurality of components, and location information of each of the plurality of components of the article; and a processor to execute a procedure, the procedure comprising:

identifying a first component related to a first character string extracted from document information related to the article, referring to the memory, obtaining first location information related to the first component in the article from the memory, determining an eye direction when a shape of the article is displayed;

determining second location information of the first component in the shape of the article related to the eye direction, based on the first location information and the eye direction, and displaying the first character string based on the second location information.

12. The information processing apparatus according to claim 11, the procedure further comprising:

identifying a second component related to a second character string extracted from the document information, referring to the memory, extracting at least one word related to the first character string from the document information, and determining a display spacing between the first character string and the second character string in accordance with the number of the words.

13. The information processing apparatus according to claim 12, wherein the determining of the eye direction determines the eye direction based on the display spacing.

14. The information processing apparatus according to claim 13, wherein the determining of the eye direction comprises:

calculating, for each of a plurality of eye directions including the eye direction, first display coordinates of the first character string and second display coordinates of the second character string for a shape of the article related to each of the plurality of eye directions, comparing a distance between the first display coordinates and the second display coordinates with the display spacing, and determining, based on a result of the comparing, the eye direction among the plurality of eye directions.

15. The information processing apparatus according to claim 11, the procedure further comprising:

extracting at least one word related to the first character string from the document information, and displaying the at least one word and the first character string on a diagram of the shape of the article from the eye direction.

* * * * *